United States Patent
Cheung et al.

(10) Patent No.: US 9,789,572 B1
(45) Date of Patent: Oct. 17, 2017

(54) UNIVERSAL AUTOMATION LINE

(71) Applicant: Flextronics AP, LLC, Broomfield, CO (US)

(72) Inventors: Dason Cheung, Fremont, CA (US); Murad Kurwa, San Jose, CA (US); Tor Krog, Seattle, WA (US); Xiuchuan Wang, Campbell, CA (US); Hao Tan, Zhuhai (CN)

(73) Assignee: Flextronics AP, LLC, Broomfield, CO (US)

( * ) Notice: Subject to any disclaimer, the term of this patent is extended or adjusted under 35 U.S.C. 154(b) by 220 days.

(21) Appl. No.: 14/531,769

(22) Filed: Nov. 3, 2014

Related U.S. Application Data (60) Provisional application No. 61/925,587, filed on Jan. 9, 2014.

(51) Int. Cl.
    *B23P 21/00* (2006.01)
(52) U.S. Cl.
    CPC ................... *B23P 21/004* (2013.01)
(58) Field of Classification Search
    CPC ...... B23P 21/004; B23P 21/00; Y10T 29/534; Y10T 29/53539; Y10T 29/53543; Y10T 29/53548; Y10T 29/49829
    See application file for complete search history.

(56) References Cited

U.S. PATENT DOCUMENTS

| | | | |
|---|---|---|---|
| 4,301,958 A * | 11/1981 | Hatakenaka | H01L 21/67144 198/341.04 |
| 4,631,812 A * | 12/1986 | Young | B25J 15/0206 198/586 |
| 5,213,195 A * | 5/1993 | Sticht | B23P 21/004 198/465.1 |
| 5,353,490 A * | 10/1994 | Kukuljan | B23P 21/00 29/564 |
| 5,539,975 A * | 7/1996 | Kukuljan | B23P 21/004 198/346.2 |
| 6,257,329 B1 | 7/2001 | Balzano | |

(Continued)

FOREIGN PATENT DOCUMENTS

| | | | | |
|---|---|---|---|---|
| DE | WO 2013083142 A1 * | 6/2013 | ............ | B23P 21/004 |
| FR | WO 2013167184 A1 * | 11/2013 | ........... | B23K 37/047 |

(Continued)

*Primary Examiner* — David Bryant
*Assistant Examiner* — Lawrence Averick
(74) *Attorney, Agent, or Firm* — Haverstock & Owens LLP (57) ABSTRACT

A universal automation line is configured for the assembly of electronics and mechanical devices. The universal automation line includes universal cells or stations that can be programmed to perform a variety of automated assembly tasks such as glue dispensing, screw driving, pick and place, etc. The stations are interchangeable by different module design such as selective soldering, heat stacking, bottom lead trimming, bottom screwing and ultrasonic welding. Each station can also include an automated robot, which is also interchangeable, to perform different tasks and complete fully automated assemblies. The stations can be sequenced inline for a fully automated line or combined with some manual operation. The stations can communicate by standardized interfaces and local networks, and can be expanded to an intranet or the internet for remote control.

25 Claims, 4 Drawing Sheets

(56) References Cited

U.S. PATENT DOCUMENTS

| | | | | |
|---|---|---|---|---|
| 6,519,837 B1* | 2/2003 | Ichikawa | ............... | B23P 21/004 29/720 |
| 6,705,001 B2* | 3/2004 | How | ................. | H01L 21/67236 198/586 |
| 8,327,531 B2* | 12/2012 | Ono | ....................... | B23P 21/004 29/429 |
| 8,626,329 B2* | 1/2014 | Dickson | ................ | B23P 21/004 198/343.1 |
| 8,720,046 B2* | 5/2014 | Ono | ....................... | B23P 21/004 29/799 |
| 9,038,265 B2* | 5/2015 | Ferenczi | ............... | B23P 21/004 29/791 |
| 9,095,943 B2* | 8/2015 | Chen | ...................... | B23P 21/004 |
| 9,248,533 B2* | 2/2016 | Ono | ....................... | B23P 21/004 |
| 9,254,539 B2* | 2/2016 | Ferenczi | ............... | B23P 21/004 |
| 2002/0131237 A1 | 9/2002 | Snyder | | |
| 2002/0157241 A1* | 10/2002 | Yamamoto | ............ | B23P 21/004 29/705 |
| 2003/0094241 A1* | 5/2003 | Huang | ............... | H01L 21/67144 156/499 |
| 2006/0044762 A1 | 3/2006 | Kikuchi | | |
| 2006/0086484 A1 | 4/2006 | Hegde | | |
| 2007/0064399 A1 | 3/2007 | Mandel | | |
| 2007/0230132 A1 | 10/2007 | Lee | | |
| 2008/0101026 A1 | 5/2008 | Ali | | |
| 2008/0144287 A1 | 6/2008 | Shigaki | | |
| 2008/0169169 A1* | 7/2008 | Huebner | ............... | B23P 21/004 198/345.3 |
| 2008/0171402 A1 | 7/2008 | Kamezos | | |
| 2008/0218977 A1 | 9/2008 | Reis | | |
| 2008/0222883 A1* | 9/2008 | Ono | ....................... | B23P 21/004 29/787 |
| 2008/0310114 A1 | 12/2008 | Pawlenko | | |
| 2009/0086439 A1 | 4/2009 | Whitton | | |
| 2009/0095461 A1 | 4/2009 | Lemak | | |
| 2009/0279218 A1 | 11/2009 | Ferru | | |
| 2009/0309215 A1 | 12/2009 | Kitabatake | | |
| 2010/0079953 A1 | 4/2010 | Okutsu | | |
| 2010/0085713 A1 | 4/2010 | Balandin | | |
| 2010/0157544 A1 | 6/2010 | Tsao | | |
| 2010/0309631 A1 | 12/2010 | Hill | | |
| 2010/0315783 A1 | 12/2010 | Lemak | | |
| 2011/0047791 A1* | 3/2011 | Ferenczi | ............... | B23P 21/004 29/791 |
| 2011/0051369 A1 | 3/2011 | Takahara | | |
| 2011/0125307 A1* | 5/2011 | Dickson | ................ | B23P 21/004 700/112 |
| 2011/0299248 A1 | 12/2011 | Liu | | |
| 2012/0020023 A1 | 1/2012 | Nemesh | | |
| 2012/0050997 A1 | 3/2012 | Chen | | |
| 2012/0314374 A1 | 12/2012 | Elkaslassy | | |
| 2014/0059822 A1* | 3/2014 | Chen | ..................... | B23P 21/004 29/38.9 |
| 2014/0283357 A1* | 9/2014 | Harada | ................ | B23P 21/004 29/430 |
| 2014/0288690 A1* | 9/2014 | Klumpp | ................ | B23P 21/004 700/112 |
| 2015/0165566 A1* | 6/2015 | Negre | .................. | B23K 37/047 414/222.13 |
| 2015/0173204 A1* | 6/2015 | Gieskes | .................. | B23P 21/00 29/832 |
| 2015/0173206 A1* | 6/2015 | Gieskes | .................. | B23P 21/00 29/739 |
| 2015/0173259 A1* | 6/2015 | Gieskes | .................. | B23P 21/00 29/832 |
| 2015/0173260 A1* | 6/2015 | Gieskes | .................. | B23P 21/00 29/832 |
| 2015/0181720 A1* | 6/2015 | Gieskes | .................. | B23P 21/00 29/834 |
| 2015/0181779 A1* | 6/2015 | Gieskes | .................. | B23P 21/00 29/832 |
| 2016/0089755 A1* | 3/2016 | Kogushi | ................ | B25J 9/0084 29/430 |
| 2016/0143363 A1* | 5/2016 | Boldrini | ................ | A24F 47/008 29/874 |
| 2016/0306346 A1* | 10/2016 | Ishiyama | ......... | G05B 19/41845 |

FOREIGN PATENT DOCUMENTS

| | | | | |
|---|---|---|---|---|
| IT | WO 2015075685 A1 * | 5/2015 | ......... | G01R 31/2806 |
| JP | EP 2784614 A2 * | 10/2014 | ............ | B23Q 41/06 |
| WO | WO 2014004838 A2 * | 1/2014 | ............. | B23P 21/00 |

* cited by examiner

UNIVERSAL AUTOMATION LINE

RELATED APPLICATIONS

This patent application claims priority under 35 U.S.C. 119 (e) of the U.S. Provisional Application, Ser. No. 61/925,587, filed Jan. 9, 2014, and entitled "Universal Assembly Line". This application incorporates U.S. Provisional Application, Ser. No. 61/925,587 in its entirety by reference.

FIELD OF THE INVENTION

The present invention is generally directed to the field of automated assembly lines. More specifically, the present invention is directed to an automated assembly line made of a series of universal cells or stations that can be programmed to perform a variety of assembly tasks.

BACKGROUND OF THE INVENTION

Currently the assemblies done in most factories for consumer electronics and other small mechanical parts are done manually or with semi-automated stations. This has been the standard for a long time because labor costs were so cheap in other countries, but now as labor wages increase and available labor decreases an automation solution is necessary. The problem with most automation solutions is that they are designed for specific tasks and come with a big price tag that can take years to see a return on the investment. Because of this big initial investment, the systems can lose money if the product is changed, discontinued or if production is decreased. Unfortunately this is something that happens very often in the consumer electronics business. Therefore a solution is needed that provides automation that can be reused and is universal for many different products.

SUMMARY OF THE INVENTION

Embodiments of a universal automation line are configured for the assembly of consumer electronics and other mechanical devices, for example devices between the sizes of personal digital assistants (PDAs) and laptop computers. The universal automation line can also be reconfigured to a larger platform for the large form factor assembly of products such as servers, chassis assemblies, etc. The universal automation line includes universal cells or stations that are interchangeable modules and can be programmed to perform a variety of automated assembly tasks such as glue dispensing, screw driving, pick and place, etc. Each station can have different module design such as selective soldering, heat stacking, bottom lead trimming, bottom screwing and ultrasonic welding. Each station can also include an automated robot, which is also interchangeable, to perform different tasks and complete fully automated assemblies. Examples of different robot types that can be used include, but are not limited to, 6-axis, 4-axis, cartesian or XYZ, and SCARA (Selective Compliance Assembly Robot Arm). The stations can be sequenced inline for a fully automated line or combined with some manual operation. The stations can communicate by SMEMA (Surface Mount Equipment Manufacturers Association) interface standard or by other local networks and standards, and can be expanded to an intranet or the internet for remote control.

BRIEF DESCRIPTION OF THE DRAWINGS

Several example embodiments are described with reference to the drawings, wherein like components are provided with like reference numerals. The example embodiments are intended to illustrate, but not to limit, the invention. The drawings include the following figures.

DETAILED DESCRIPTION OF THE EMBODIMENTS

Embodiments of the present application are directed to a universal automation line. Those of ordinary skill in the art will realize that the following detailed description of the universal automation line is illustrative only and is not intended to be in any way limiting. Other embodiments of the universal automation line will readily suggest themselves to such skilled persons having the benefit of this disclosure.

Reference will now be made in detail to implementations of the universal automation line as illustrated in the accompanying drawings. The same reference indicators will be used throughout the drawings and the following detailed description to refer to the same or like parts. In the interest of clarity, not all of the routine features of the implementations described herein are shown and described. It will, of course, be appreciated that in the development of any such actual implementation, numerous implementation-specific decisions must be made in order to achieve the developer's specific goals, such as compliance with application and business related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

The universal automation line enables a system that can be used for different assembly applications with very little cost and time to change between products compared to that of a conventional assembly line. The ability to quickly and cost-effectively re-purpose an assembly line is particularly useful for products having shorter product life-cycles, such as electronic devices. For each new assembly process a sequence of stations is configured according to the specific steps of the assembly process. The sequence of stations specifies a number of stations and one or more modules within each station. Those stations from a previous assembly process which already have the needed module built in are equipped with the correct tools, fixtures and program corresponding to the new assembly process. Once the raw materials are supplied to the newly configured universal automation line having re-purposed stations, the universal automation line is ready for operation.

The universal automation line is configured as a fully automated or partially automated assembly line with multiple stations. Each station functions as a cell for performing one or more assembly steps associated with the entire assembly process. Each station can perform the one or more assembly steps using one or more tools per station. The amount of tools or assembly steps to be performed is based on production speed and line balancing. Each station includes one or more modules for performing assembly steps. The module can be a robot, an ultrasonic welding machine, a press machine, a laser engraving machine, a heat staking machine or any other device that may be used for an assembly line, all of which can be automated. Examples of different robot types that can be used include, but are not limited to, 6-axis, 4-axis, cartesian or XYZ, and SCARA. Each station can include tools for use by the module. For some modules, like the ultrasonic welding machine, there may not be any extra tools needed, but for other modules, like the 6-axis robot, the station may have multiple tools, such as a screw driver, and a pick and place tool, for use by the module. Each station can include one or more home docking locations for the extra tools so that the robot can be programmed to retrieve and change the tools itself. A station-to-station conveyance mechanism transports a partially assembled device between stations. Such a conveyance mechanism can include, but is not limited to, a conveyor belt standardized in position and size for alignment between stations. In some cases, the position of the conveyor belt is adjustable in one or more dimensions. In some cases, a width of the conveyor belt is adjustable. Intra-station and inter-station control is achieved through localized and/or remote control.

In some embodiments, each station is equipped with several universal features. For example, on a back side of each station is a universal material access port for loading of raw materials. The material access port can be aligned with trays, bowl feeders, a conveyor belt, a vibration feeder, a tape and reel feeder, etc. A universal material access port is useful because for almost every product the material handling is different. By having a universal connector that can load raw materials using different material handling options further enhances the systems ability for automation as well as improves design flexibility and minimizes line reconfiguration. There is a Human Machine Interface touch screen monitor on the front of each station to check progress, install new programs, and provide additional interface for station interaction by the user. The conveyance mechanism is also standardized for simple alignment from station to station.

In some embodiments, a station is equipped with the ability to perform operations from the top side, the bottom side or both. For some applications, it is more efficient and convenient for certain assembly steps to be performed bottom-up within the station as opposed to top-down. A station can be configured with only top-down functionality or only bottom-up functionality. A station can also be configured with both top-down and bottom-up functionality that can be performed serially or simultaneously. By having the ability to perform operations from the bottom-up, production speed can be increased because products do not need to be flipped and products can be kept in the same carrier. Examples of such bottom-up functions include, but are not limited to, screwing, soldering and heat staking.

The tools for each different assembly process will vary, as each product has its own unique design specifications and corresponding assembly requirements. Some of the tools may be specific for a single assembly step or for the assembly of a single product, such as a pick and place tool that is used for an odd shaped object. Other tools may be designed for multiple assembly steps within the assembly of a single product, and for use in the assembly of multiple different products. Examples of multiple use tools include, but are not limited to, glue dispensers, soldering tools, screw drivers, universal pick and place tools, vacuum nozzle, etc. Each different assembly step performed by the multiple use tool is controlled by a different control algorithm. For example, a screwing tool can be configured to tighten a screw at multiple different locations on the product, each location requiring the screwing tool to move to each specific screwing location. For each location where a universal automation line is installed there can be a "tool shed" that stores a variety of tools that can be used for each station/module pair in the universal automation line. Based on the application an operator can place the needed tools into the correct locations within each station. This process can also be automated.

In some embodiments, a station includes a smart camera to perform inspection, scanning, positioning, and other functions benefiting from the use of visual monitoring. In some embodiments, a station control is configured to run a self-calibration to properly calibrate the components within the station including, but not limited to, the conveyor mechanism, the module and corresponding tools, the universal material access port and corresponding feeding mechanism and the camera. The self-calibration process ensures the control program can be transferable to different station without any modification.

Figure 1:
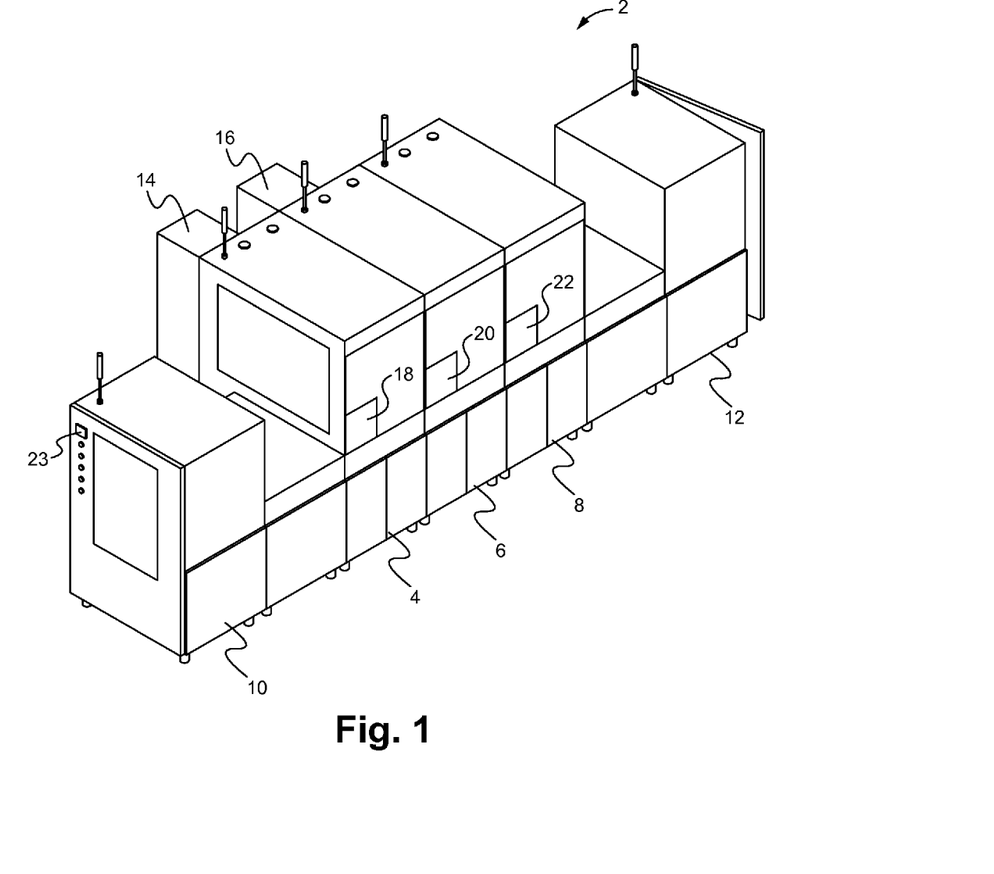
FIG. 1 illustrates a universal automation line according to an embodiment.

FIG. 1 illustrates a universal automation line according to an embodiment. The exemplary universal automation line 2 includes three stations 4, 6 and 8. It is understood that the configuration of the universal automation line 2 is for exemplary purposes only and that alternative configurations having more or less than three stations are also contemplated. Each station performs one or more assembly steps in the fabrication of a device. The end result of the universal automation line may be a completely assembled device or a sub-assembly that can be subsequently used as part of a completely assembled device. The stations 4, 6 and 8 are aligned in sequence, each having a conveyance mechanism for inputting the device into the station and for outputting the device from the station. The conveyance mechanism is universally aligned so that when multiple stations are aligned, the respective conveyance mechanisms are also aligned. Although reference is made to a "device" being input to and output from each station, it is understood that such reference may refer to any partially assembled state of the device. The conveyance mechanism is standardized from station to station enabling the stations to be used as "building blocks" for forming the universal automation line. Any number of stations, arranged in any order, can be used to meet the desired assembly steps. When a new product is to be assembled, stations can be added, removed and/or rearranged.

Each of the stations includes a human machine interface (HMI), such as a touchscreen monitor. Specifically, station 4 includes HMI 18, station 6 includes HMI 20 and station 8 includes HMI 22.

In some embodiments, the universal automation line also includes material handling devices selectively coupled to one or more stations for loading and unloading materials associated with the assembly of the device. In the exemplary universal automation line 2, a front-end loading device 10 is coupled to the station 1, a back-end unloading device 12 is coupled to the station 3, a material supply cabinet 14 is coupled to the station 1, and a material supply cabinet 16 is coupled to the station 6. The loading device 10 is configured to supply a base unit to which additional assembly steps are performed. Examples of such base units include, but are not limited to, a portion of an outer housing of the device or other mounting element which can be used as a foundation for adding the remaining components of the device, a printed circuit board including station electronics, or a printed circuit board already secured to a portion of the outer housing or other mounting element. In some embodiments, the base unit is positioned on a tray or other type of carrier configured to couple with the conveyance mechanism of each station.

The unloading device 12 is configured to receive the assembled device from the station 8. The material supply cabinet 14 is configured to supply components or sub-assemblies to the station 4 via an input opening (not shown) in the frame of the station 4. The material supply cabinet 16 is configured to supply components or sub-assemblies to the station 6 via an input opening (not shown) in the frame of the station 6.

Figure 2:
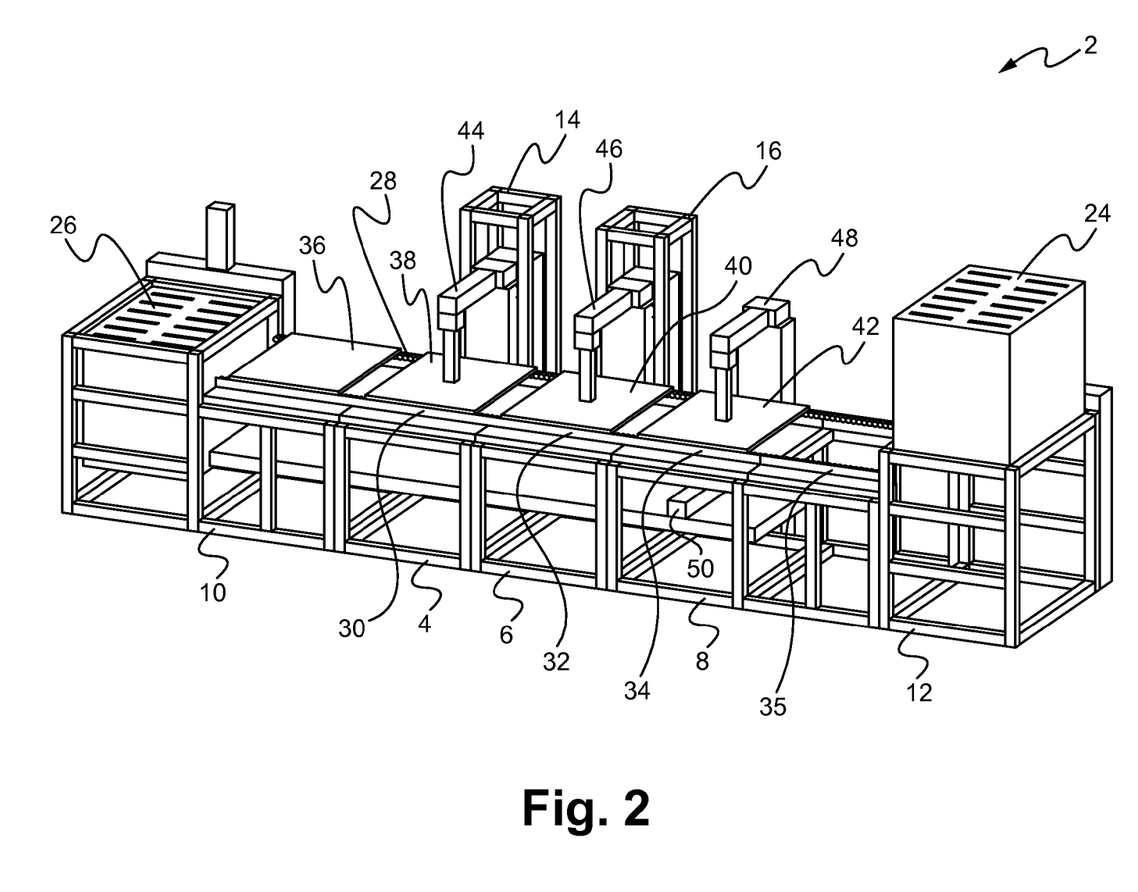
FIG. 2 illustrates the universal automation line of FIG. 1 with the housing removed.

In the exemplary universal automation line 2 shown in FIG. 1, each of the stations 4, 6 and 8, as well as the loading device 10 and the unloading device 12 include a housing. FIG. 2 illustrates the universal automation line 2 of FIG. 1 with the housing removed. In the exemplary configuration of FIG. 2, the loading device 10 includes a movable tray holder 26 configured to hold multiple trays. In some embodiments, the movable tray holder 26 is a rack having multiple shelves, each shelf for holding a tray. Each tray includes one or more base units. The loading device 10 also includes a conveyor mechanism 28 coupled to receive trays, such as tray 36, from the movable tray holder 26. The movable tray holder 26 is configured to move up and down to align one shelf at a time with the conveyor mechanism 28. When a shelf is aligned with the conveyor mechanism 28, the tray in the aligned shelf is moved from the shelf to the conveyor mechanism. In some embodiments, the conveyor mechanism includes an alignment mechanism, such as side rails, for establishing and maintaining the tray in the proper position. The conveyor mechanism can be any conventional mechanism for transporting the tray including, but not limited to, a conveyor belt, rollers and a drive train that engages the tray such as a chain and interlocking mechanism that engages a corresponding interlocking element on the tray. The conveyor mechanism 28 is aligned with an output opening (not shown) in the frame of the loading device 10.

The unloading device 12 includes a movable tray holder 24 configured to hold multiple trays. In some embodiments, the movable tray holder 24 is a rack having multiple shelves, each shelf for holding a tray. The unloading device 12 also includes a conveyor mechanism 35 coupled to supply trays to the movable tray holder 24. The movable tray holder 24 is configured to move up and down to align one shelf at a time with the conveyor mechanism 35. When a shelf is aligned with the conveyor mechanism 35, the tray is moved from the conveyor mechanism to the aligned shelf. The conveyor mechanism 35 is aligned with an input opening (not shown) in the frame of the unloading device 12.

The station 4 includes a module 44. In the exemplary universal automation line 2, the module 44 is a 6-axis robot. The station 4 also includes a conveyor mechanism 30. The conveyor mechanism 30 is configured similarly as and is aligned with the conveyor mechanism 28 of the loading device 10. A first end of the conveyor mechanism 30 is aligned with an input opening (not shown) in the frame of the station 4 and a second end of the conveyor mechanism 30 is aligned with an output opening (not shown) in the frame of the station 4. The input opening in the frame of the station 4 is aligned with the output opening in the frame of the loading device 10. The conveyor mechanism 30 is configured to receive a tray, such as tray 38, from the conveyor mechanism 28. The conveyor mechanism 30 transports the tray 38 to a defined work position along the conveyor mechanism 30 where one or more assembly steps are performed on the base unit by the module 44.

The station 6 includes a module 46. In the exemplary universal automation line 2, the module 46 is a 6-axis robot. The station 6 also includes a conveyor mechanism 32. The conveyor mechanism 32 is configured similarly as and is aligned with the conveyor mechanism 30 of the station 4. A first end of the conveyor mechanism 32 is aligned with an input opening (not shown) in the frame of the station 6 and a second end of the conveyor mechanism 32 is aligned with an output opening (not shown) in the frame of the station 6. The input opening in the frame of the station 6 is aligned with the output opening in the frame of the station 4. The conveyor mechanism 32 is configured to receive a tray, such as tray 40, from the conveyor mechanism 30. The conveyor mechanism 32 transports the tray 40 to a defined work position along the conveyor mechanism 32 where one or more assembly steps are performed on the device by the module 46.

The station 8 includes a module 48. In the exemplary universal automation line 2, the module 48 is a press machine configured to apply downward pressure on a device under assembly. The station 8 also includes a module 50. In this exemplary application, the module 50 is a cartesian robot. The module 48 is considered a top-side module and the module 50 is considered a bottom-side module. The module 44 in the station 4 and the module 46 in the station 6 are also considered top-side modules. In general, top-side modules are positioned above the device under assembly and can perform top-down assembly steps on an upward facing portion of the device under assembly. Bottom-side modules are positioned underneath the device under assembly and can perform down-up assembly steps on a downward facing portion, or underside, of the device under assembly. The bottom-side module eliminates the need for rotating the device under assembly to expose the underside to the top-side assembly. In order for the bottom-side module 50 to interface with the underside of the device under assembly, the tray 42 on which the device under assembly is positioned has an opening (not shown) under the device under assembly.

The station 8 also includes a conveyor mechanism 34. The conveyor mechanism 34 is configured similarly as and is aligned with the conveyor mechanism 32 of the station 6. A first end of the conveyor mechanism 34 is aligned with an input opening (not shown) in the frame of the station 8 and a second end of the conveyor mechanism 34 is aligned with an output opening (not shown) in the frame of the station 8. The input opening in the frame of the station 8 is aligned with the output opening in the frame of the station 6. The conveyor mechanism 34 is configured to receive a tray, such as tray 42, from the conveyor mechanism 32. The conveyor mechanism 34 transports the tray 42 to a defined work position along the conveyor mechanism 34 where one or more assembly steps are performed on the device by the module 48 and the module 50. Once the assembly steps are completed by the module 48 and the module 50, the conveyor mechanism 34 transports the tray 42 to the output opening in the frame of the station 8, which is aligned with the input opening in the frame of the unloading device 12. The conveyor mechanism 35 in the unloading device 12 is configured to receive a tray from the conveyor mechanism 34.

Figure 3:
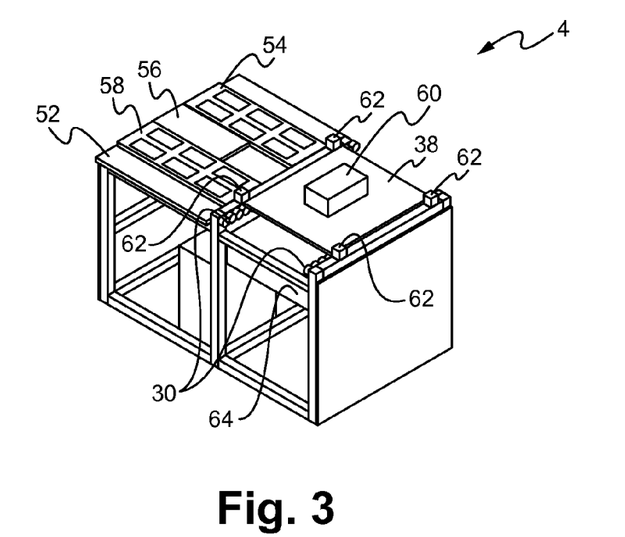
FIG. 3 illustrates a different view of the station 4 from FIG. 2 with portions of the housing and the module removed according to an embodiment.

FIG. 3 illustrates a different view of the station 4 from FIG. 2 with portions of the housing and the module 44 removed according to an embodiment. The station 4 includes a main tooling plate 52 onto which a tool storage plate 54, a module plate 56 and a material handling area/sub-assembly area 58 are configured. The module plate 56 provides a foundation for mounting the module 44. In some embodiments, the module plate 56 is a separate element from the module 44. In other embodiments, the module plate 56 and the module 44 are integrated together.

In some embodiments, the module 44 is configured to use multiple different tools. In such a configuration, the tools can be stored in the tool storage plate 54, each tool having a defined storage location on the tool storage plate 54. The tool storage plate 54 is accessible by the module 44 for returning a tool currently in use and for retrieving a different tool for subsequent use.

Figure 4:
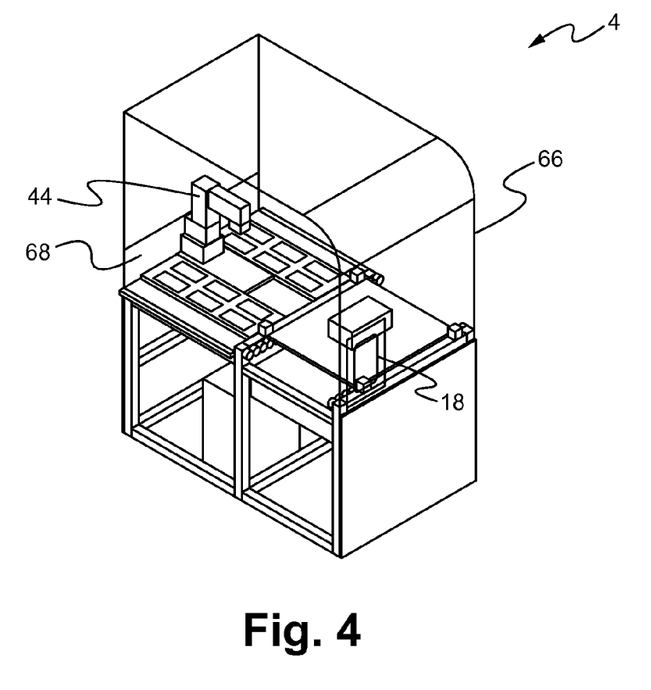
FIG. 4 illustrates another view of the station 4 from FIG. 2 with portions of the housing removed according to an embodiment.

The material handling/sub-assembly area 58 is configured to either store assembly materials to be used for subsequent assembly onto the device under assembly 60 or as an area where both assembly materials are stored and where a sub-assembly unit can be assembled, the sub-assembly unit then assembled to the device under assembly 60. In the former case, assembly materials such as individual components and/or pre-assembled sub-assembly units are received from the material supply cabinet 14 and stored in the material handling/sub-assembly area 58. In some embodiments, the material handling/sub-assembly area 58 includes a conveyor mechanism (not shown) configured to receive assembly materials from the material supply cabinet 14, for example through a universal material access opening 68 in the rear of a housing 66 as shown in FIG. 4. In some embodiments, the assembly materials are placed on a tray and the tray is transported from the material supply cabinet 14 to the material handling/sub-assembly area 58. The assembly materials are positioned in a defined area for subsequent retrieval by the module 44. In some embodiments, the material supply cabinet 14 is configured with a movable tray holder similar to the movable tray holder 26 in the loading device 10, and the conveyor mechanism in the material handling/sub-assembly area 58 and the movable tray holder in the material supply cabinet 14 function similarly as the conveyor mechanism 28 and the movable tray holder 26 of the loading device 10. It is understood that alternative mechanisms for transporting assembly materials from the material supply cabinet 14 to the material handling/sub-assembly area 58 can be used.

In the later case where the material handling/sub-assembly area 58 includes the sub-assembly area, a sub-assembly unit is assembled in the material handling/sub-assembly area 58. Similar to the case where the material handling/sub-assembly area 58 is configured as an assembly materials receiving and holding area, assembly materials are received from the material supply cabinet 14 and stored in the material handling/sub-assembly area 58. Additionally, one or more assembly steps are performed in the material handling/sub-assembly area 58 to complete the sub-assembly unit. The sub-assembly unit is then transported by the module 44 and assembled to the device under assembly 60.

In some embodiments, the module 44 may not be required to use multiple different tools and as such the tool storage plate 54 may not be necessary. In this case, the tool storage plate 54 can still be present and used for tool storage, or the tool storage plate 54 can be replaced by an additional material handling/sub-assembly area. In some embodiments, the station 4 may not be configured to add any new parts or sub-assemblies to the device under assembly. In this case, the material handling/sub-assembly area 58 can still be present, or the material handling/sub-assembly area 58 can be replaced by an additional tool storage plate.

It is understood that the relative position of the module plate 56, the tool storage plate 54 and the material handling/sub-assembly area 58 shown in FIG. 3 is for exemplary purposes and that alternative positions and configurations are also contemplated.

As described above, the conveyor mechanism 30 is configured to transport the tray 38 to a defined work position. In some embodiments, tray securing mechanisms 62 are used to properly align and secure the tray 38 in the defined work position so as to ensure that a device under assembly 60 is properly positioned for subsequent assembly steps.

The station 4 also includes station electronics 64. The station electronics 64 are coupled to the module 44, the conveyor mechanism 30 and the tray securing mechanisms 62 to provide electronic control. In some embodiments, the station electronics 64 are also coupled to a conveyor mechanism for transporting materials or sub-assemblies, such as from the material supply cabinet 14, to the material handling/sub-assembly area 58. The station 4 can include various sensors (not shown) for monitoring operations and providing control feedback.

Figure 5:
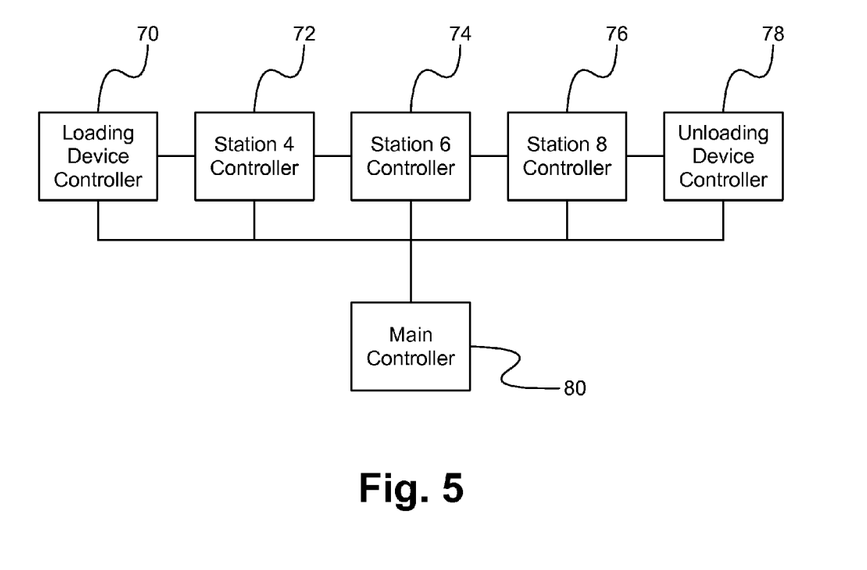
FIG. 5 illustrates a conceptual block diagram of a control structure of the universal automation line of FIGS. 1 and 2 according to an embodiment.

The station electronics for each station and material handling device can be locally controlled and/or remotely controlled. Each of the stations and material handling devices can include a user interface, such as the HMI 18 included with the station 4, the HMI 20 included with the station 6, the HMI 22 included with the station 8 and the HMI 23 included with the loading device 10 shown in FIG. 1. Also not shown in FIG. 1, the unloading device 12, the material handling cabinet 14 and the material handling cabinet 16 can also each have a user interface. The user interface enables a user to check progress, install new programs, and provide additional interface for interaction by the user at a localized level. One or more of the local user interfaces can be configured for system wide interface and control of each of the stations and material handling devices in the universal automation line. A remotely located controller can also be networked to the universal automation line for remote control. FIG. 5 illustrates a conceptual block diagram of a control structure of the universal automation line 2 of FIGS. 1 and 2 according to an embodiment. A loading device controller 70 is included as part of the station electronics and/or the HMI 23 of the loading device 10. A station controller 72 is included as part of the station electronics and/or the HMI 18 of the station 4. A station controller 74 is included as part of the station electronics and/or the HMI 20 of the station 6. A station controller 76 is included as part of the station electronics and/or the HMI 22 of the station 8. An unloading device controller 78 is included as part of the station electronics and/or the HMI of the unloading device 12. A main controller 80 is networked to each of the controller 70, 72, 74, 76 and 78 for overall control of the universal automation line 2. The main controller 80 is shown conceptually in FIG. 5 as a separate controller but can implemented as part of one of the station or material handling controllers 70, 72, 74, 76 or 78. Each of the station and material handling device controllers are networked together to provide inter-controller signaling, such as signaling to indicate that a station has completed the programmed assembly steps and is ready to transport the tray to a next station, or that a station is ready to receive a tray.

In some embodiments, station control is configured to also provide control of any auxiliary material handling device coupled to the station. For example, the station controller 72 can be configured to control both the station 4 and the material handling cabinet 14. In other embodiments, the auxiliary material handling device includes separate control from the station. For example, the station controller 72 can be configured to control the station 4 and a separate controller can be configured to control the material handling cabinet 14. In this case, the separate controller of the material handling cabinet 14 is networked to the station controller 72, the main controller 80 and/or at least one of the other controllers in the universal automation line network.

An exemplary application of the universal automation line 2 is for the assembly of a computer mouse. In this case, the loading device 10 is loading with trays, each tray having a bottom mouse sub-assembly, referred to as the mouse base. The loading device 10 transports a tray to the station 4. Station 4 is configured to perform three assembly steps. Before the assembly steps are performed, one or more scroll wheels are loaded into the material handling/sub-assembly area 58 of the station 4 from the material supply cabinet 14. A first assembly step is to load one of the scroll wheels from the material handling/sub-assembly area 58 onto the mouse base. To perform this step, the 6-axis robot retrieves a gripper tool from the tool storage plate 54, uses the gripper tool to pick the scroll wheel from the material handling and sub-assembly area 58 and place the scroll wheel in the proper position on the mouse base. A second assembly step is to add and tighten three screws. To perform this step, the 6-axis robot returns the gripper tool to the tool storage plate 54, retrieves a screw driver tool from the tool storage plate 54, loads the screw driver tool with a screw, places the screw in the proper position on the mouse base, and tightens the screw. In some embodiments, the station includes a screw loading device that supplies the screw to the screw driver tool. In other embodiments, the screw driver tool is pre-loaded with screws that can be sequentially loaded to the tip of the screw driver tool, such as from a cartridge. In still other embodiments, the screws are loaded into and stored in the material handling/sub-assembly area 58 concurrently or separately from the mouse base. The 6-axis robot then loads the screw driver tool with a second screw, places the screw in the proper position on the mouse base, and tightens the screw. The same procedure is repeated to place and tighten a third screw onto the mouse base. A third assembly step is to dispense adhesive on an edge of the mouse base. To perform this step, the 6-axis robot returns the screw driver tool to the tool storage plate 54, retrieves a dispenser tool from the tool storage plate 54, and applies adhesive from the dispenser tool to the edge of the mouse base. In some embodiments, the dispenser tool is pre-loaded with adhesive. The 6-axis robot then returns the dispenser tool to the tool storage plate 54. After the third assembly step is performed, the tray is then transported to station 6 after proper signaling control is established between the two stations.

Station 6 is configured to perform six assembly steps. Before the assembly steps are performed, a mouse cover, a click-scroll wheel cover, a battery cover and a light tube are loaded into the material handling/sub-assembly area of the station 6 from the material supply cabinet 16. In this exemplary configuration, the material handling/sub-assembly area is divided into a material handling area and a sub-assembly area. A first assembly step is to load the mouse cover from the material handling area to the sub-assembly area. To perform this step, the 6-axis robot retrieves a first gripper tool from the tool storage plate, uses the first gripper tool to pick the mouse cover from the material handling area and place the mouse cover in the sub-assembly area. A second assembly step is to add the click-scroll wheel cover to the mouse cover. To perform this step, the 6-axis robot returns the first gripper tool to the tool storage plate, retrieves a first vacuum nozzle tool from the tool storage plate, picks the click-scroll wheel cover from the material handling area and places the click-scroll wheel cover on the proper position on the mouse cover. A third assembly step is to add and tighten a screw. To perform this step, the 6-axis robot returns the first vacuum nozzle tool to the tool storage plate, retrieves a screw driver tool from the tool storage plate, loads the screw driver tool with a screw, places the screw in the proper position on the mouse cover, and tightens the screw. In some embodiments, the station includes a screw loading device that supplies the screw to the screw driver tool. In other embodiments, the screw driver tool is pre-loaded with screws that can be sequentially loaded to the tip of the screw driver tool, such as from a cartridge. In still other embodiments, the screws are loaded into and stored in the material handling/sub-assembly area concurrently or separately from the mouse cover, the click-scroll wheel cover, the battery cover and the light tube. A fourth assembly step is to add the battery cover to the mouse cover. To perform this step, the 6-axis robot returns the screw driver tool to the tool storage plate, retrieves a second vacuum nozzle tool from the tool storage plate, picks the battery cover from the material handling area and places the battery cover on the proper position on the mouse cover. A fifth assembly step is to add the light tube to an underside of the mouse cover. To perform this step, the mouse cover is turned upside down while in the sub-assembly area. In some embodiments, the sub-assembly area includes a carrier configured to receive the mouse cover and to secure the mouse cover in place. The carrier can be coupled to a cam or other rotational mechanism for rotating the carrier from an upright to an upside down position, thereby turning the mouse cover upside down. The 6-axis robot returns the second vacuum nozzle tool to the tool storage plate, retrieves a second gripper tool from the tool storage plate, picks the light tube from the material handling area and places the light tube on the proper position on the underside of the upside down mouse cover. The carrier is then turned right side up. A sixth assembly step is to add the mouse cover to the mouse base. To perform this step, the 6-axis robot returns the second gripper tool to the tool storage plate, retrieves the first gripper tool from the tool storage plate, picks the mouse cover from the sub-assembly area and places the mouse cover on the mouse base positioned on the tray received from station 4. After the sixth assembly step is performed, the tray is then transported to station 8 after proper signaling control is established between the two stations.

Station 8 is configured to perform one assembly step. This step is to add and tighten four screws. To perform this step, the press machine applies downward pressure on the mouse cover. The underside of the mouse base is exposed to the bottom-side cartesian robot. The cartesian robot is fitted with a screw driver tool. The cartisian robot sequentially places and tightens each of four screws into proper positions on the underside of the mouse base. In some embodiments, the station includes a screw loading device that supplies the screw to the screw driver tool used by the cartesian robot. In other embodiments, the screw driver tool is pre-loaded with screws that can be sequentially loaded to the tip of the screw driver tool, such as from a cartridge. After the four screws are added and tightened, the tray is transported to the unloading device 12 after proper signaling control is established between the station 8 and the unloading device 12.

The unloading device 12 receives the tray with assembled mouse from the station 8 and stores the tray in a rack of the movable tray holder.

In the case described above for assembling a computer mouse, each of the stations is configured to perform multiple assembly steps. Such a configuration increases utility of each station, however decreases the overall assembly speed of the entire line because having a module change tools is time consuming. Increased utility is often beneficial for prototyping. For high volume production, each station can be configured such that no tool swapping is performed. In some applications, each station performs a single assembly step. Also, the exemplary configurations described above show assembly of a single device per tray. For increased through-put each tray can transport multiple devices.

In some embodiments, a manual station is connected with the universal automation line. For certain production lines and products there are assembly steps that are too difficult or too expensive to be done automatically so these can be done manually. Interconnecting a manual station with a conveyor mechanism of the universal automation line enables the line to still run seamlessly and be almost completely automated.

Each of the controllers in the universal automation line is re-programmable for each new product to be assembled. In some embodiments, an external applications repository is maintained The repository includes a library of stations, modules and tools that are designed for different assemblies and different products. This library is accessible by line engineers as a template for designing a new line or product. This reduces non-recurring engineering and other costs involved in setting up the universal automation line. It also decreases the time to production because the tools have already been tested and proven to work for other products.

Most components of each station are reusable by simply reprogramming the controller and reusing the existing module within the station. In some applications, products may require customized module elements, such as a customized gripper tool used by a robot to pick and place a non-standard sized component. However, in this case only the tool is customized, not the robot or remainder of the station. The cost to manufacture a customized tool is much less expensive, and less timely to manufacture than manufacturing an entire robot with customized gripper.

The present application has been described in terms of specific embodiments incorporating details to facilitate the understanding of the principles of construction and operation of the universal automation line. Many of the components shown and described in the various figures can be interchanged to achieve the results necessary, and this description should be read to encompass such interchange as well. As such, references herein to specific embodiments and details thereof are not intended to limit the scope of the claims appended hereto. It will be apparent to those skilled in the art that modifications can be made to the embodiments chosen for illustration without departing from the spirit and scope of the application.

What is claimed is:

1. An assembly line configured to perform a plurality of assembly steps on a device under assembly, wherein the assembly line comprises:
   a plurality of stations aligned serially, wherein each station is a stand-alone device and comprises:
      a module configured to perform one or more assembly steps on the device under assembly;
      a conveyor mechanism configured to receive as input the device under assembly, to transport the device under assembly to a defined work position, and to output the device under assembly from the station; and
      an external housing on all sides of the station,
   wherein the plurality of stations are serially aligned such that the conveyor mechanisms of adjacent stations are aligned to output the device under assembly from one station and to input the device under assembly to an adjacent station, a loading device coupled to a first station in the serially aligned plurality of stations, wherein the loading device comprises a conveyor mechanism configured to output the device under assembly from the loading device, further wherein the conveyor mechanism of the loading device is aligned with the conveyor mechanism of the first station, wherein the loading device further comprises a movable supply device coupled to the conveyor mechanism of the loading device, wherein the movable supply device comprises a plurality of carrier tray holder shelves, each carrier tray holder shelf is configured to hold a carrier tray that carries the device under assembly, and the movable supply device is movable so as to selectively align one of the carrier tray holder shelves with the conveyor mechanism such that each carrier tray with the device under assembly is transported from the movable supply device to an output opening in the loading device.

2. The assembly line of claim 1 wherein the module comprises a robot.

3. The assembly line of claim 2 wherein the robot comprises one of a 6-axis robot, a 4-axis robot, a cartesian robot, and a Selective Compliance Assembly Robot Arm.

4. The assembly line of claim 3 wherein the module comprises an interchangeable tool coupled to the robot.

5. The assembly line of claim 1 wherein the module comprises one of an ultrasonic welding machine, a press machine, a laser engraving machine, and a heat staking machine.

6. The assembly line of claim 1 wherein for each station, one side of the external housing has an input opening through which the device under assembly is input into the station, wherein the input opening is aligned with the conveyor mechanism, further wherein another side of the external housing has an output opening through which the device under assembly is output from the station, wherein the output opening is aligned with the conveyor mechanism.

7. The assembly line of claim 6 wherein the output opening of one station is aligned with the input opening of an adjacent other station.

8. The assembly line of claim 6 wherein the external housing of each station further comprises a material access opening through which assembly materials are input into the station.

9. The assembly line of claim 8 further comprising a material supply cabinet configured to store the assembly materials, wherein the material supply cabinet is aligned with the material access opening of one of the stations.

10. The assembly line of claim 9 wherein the station further comprises an assembly materials conveyor mechanism aligned with the material access opening and configured to receive the assembly materials input from the material supply cabinet.

11. The assembly line of claim 1 wherein the loading device further comprises an external housing on all sides, one side of the external housing having the output opening, further wherein the output opening of the loading device is aligned with the input opening of the first station.

12. The assembly line of claim 1 further comprising an unloading device coupled to a last station in the serially aligned plurality of stations.

13. The assembly line of claim 12 wherein the unloading device comprises a conveyor mechanism configured to input the device under assembly into the unloading device from the last station, further wherein the conveyor mechanism of the unloading device is aligned with the conveyor mechanism of the last station.

14. The assembly line of claim 13 wherein the unloading device further comprises a movable supply device coupled to the conveyor mechanism of the unloading device, wherein the movable supply device comprises a plurality of carrier tray holder shelves, each carrier tray holder shelf is configured to hold a carrier tray that carries the device under assembly, and the movable supply device is movable so as to selectively align one of the carrier tray holder shelves with the conveyor mechanism such that each carrier tray with the device under assembly is transported from an input opening in the unloading device to the movable supply device of the unloading device.

15. The assembly line of claim 14 wherein the unloading device further comprises an external housing on all sides, one side of the external housing having the input opening, further wherein the input opening of the unloading device is aligned with the output opening of the last station.

16. The assembly line of claim 1 wherein each station further comprises station electronics including a controller configured to automate operation of the station including operation of the module and the conveyor mechanism.

17. The assembly line of claim 16 further comprising a control network including the controller of each station of the plurality of stations.

18. The assembly line of claim 16 wherein each station further comprises a human interface machine coupled to the controller.

19. The assembly line of claim 16 wherein the controller is re-programmable to modify the one or more assembly steps performed by the module.

20. The assembly line of claim 1 further comprising a camera configured to perform visual monitoring corresponding to one or more assembly steps.

21. The assembly of claim 1 wherein one or more stations further comprises a second module configured to perform one or more assembly steps on the device under assembly.

22. The assembly of claim 21 wherein the module comprises a top-side module and the second module comprises a bottom-side module.

23. The assembly line of claim 1 where each station is interchangeable within the assembly line.

24. An assembly line configured to perform a plurality of assembly steps on a device under assembly, wherein the assembly line comprises:
  a plurality of stations aligned serially, wherein each station is a stand-alone device and comprises:
    a module configured to perform one or more assembly steps on the device under assembly;
    a conveyor mechanism configured to receive as input the device under assembly, to transport the device under assembly to a defined work position, and to output the device under assembly from the station, wherein the plurality of stations are serially aligned such that the conveyor mechanisms of adjacent stations are aligned to output the device under assembly from one station and to input the device under assembly to another adjacent station; and
    an external housing on all sides of the station, one side of the external housing has an input opening through which the device under assembly is input into the station, wherein the input opening is aligned with the conveyor mechanism, further wherein another side of the external housing has an output opening through which the device under assembly is output from the station, wherein the output opening is aligned with the conveyor mechanism, further wherein the output opening of one station is aligned with the input opening of the other adjacent station, wherein the external housing further comprises a material access opening through which assembly materials are input into the station;
    an assembly materials conveyor mechanism aligned with the material access opening and configured to receive the input assembly materials; and
    station electronics including a controller configured to automate operation of the station including operation of the module, the conveyor mechanism, and the assembly materials conveyor mechanism;
  one or more material supply cabinets each configured to store the assembly materials, wherein one of the material supply cabinets is aligned with a corresponding material access opening of one of the plurality of stations, further wherein the assembly materials conveyor mechanism of the station is configured to input the assembly materials from the material supply cabinet into the station;
  a loading device coupled to a first station in the serially aligned plurality of stations, wherein the loading device comprises an external housing on all sides, one side of the external housing having an output opening, a first movable supply device having a plurality of carrier tray holder shelves, and a conveyor mechanism coupled to the first movable supply device, wherein each carrier tray holder shelf is configured to hold a carrier tray that carries the device under assembly, and the first movable supply device is movable so as to selectively align one of the carrier tray holder shelves with the conveyor mechanism such that each carrier tray with the device under assembly is selectively output from the loading device through the output opening, further wherein the output opening of the loading device is aligned with the input opening of the first station; and
  an unloading device coupled to a last station in the serially aligned plurality of stations, wherein the unloading device comprises an external housing on all sides, one side of the external housing having an input opening, a second movable supply device having a plurality of carrier tray holder shelves, and a conveyor mechanism coupled to the second movable supply device, the second movable supply device is movable so as to selectively align one of the carrier tray holder shelves with the conveyor mechanism such that each carrier tray with the device under assembly is selectively input from the last station into the unloading device through the input opening, further wherein the input opening of the unloading device is aligned with the output opening of the last station.

25. An assembly line configured to perform a plurality of assembly steps on a device under assembly, wherein the assembly line comprises:
  a plurality of stations aligned serially, wherein each station is a stand-alone device and comprises:
    a module configured to perform one or more assembly steps on the device under assembly;

a conveyor mechanism configured to receive as input the device under assembly, to transport the device under assembly to a defined work position, and to output the device under assembly from the station; and an external housing on all sides of the station, wherein the plurality of stations are serially aligned such that the conveyor mechanisms of adjacent stations are aligned to output the device under assembly from one station and to input the device under assembly to an adjacent station; and an unloading device coupled to a last station in the serially aligned plurality of stations, wherein the unloading device comprises a conveyor mechanism configured to input the device under assembly into the unloading device from the last station, further wherein the conveyor mechanism of the unloading device is aligned with the conveyor mechanism of the last station, wherein the unloading device further comprises a movable supply device coupled to the conveyor mechanism of the unloading device, wherein the movable supply device comprises a plurality of carrier tray holder shelves, each carrier tray holder shelf is configured to hold a carrier tray that carries the device under assembly, and the movable supply device is movable so as to selectively align one of the carrier tray holder shelves with the conveyor mechanism such that each carrier tray with the device under assembly is transported from an input opening in the unloading device to the movable supply device of the unloading device.

\* \* \* \* \*